United States Patent [19]

Koppe et al.

[11] Patent Number: 5,343,236
[45] Date of Patent: Aug. 30, 1994

[54] AUTOMATIC CABLE ATTENUATION COMPENSATION SYSTEM

[75] Inventors: Rudolf P. Koppe; Nicolaas J. H. Eck, both of Breda, Netherlands

[73] Assignee: U.S. Philips Corporation, New York, N.Y.

[21] Appl. No.: 69,883

[22] Filed: Jun. 1, 1993

[30] Foreign Application Priority Data

Jun. 3, 1992 [EP] European Pat. Off. ........ 92201596.1

[51] Int. Cl.⁵ ............................................. H04N 7/10
[52] U.S. Cl. .......................................... 348/6; 348/710; 348/192; 333/28 R; 333/18
[58] Field of Search ................. 358/86, 36, 37, 38, 358/166, 167, 177, 174, 184, 195.1, 35, 188, 10, 139, 160; 455/234.1; 333/28 R, 18; 348/6, 181, 183, 192; H04N 7/10

[56] References Cited

U.S. PATENT DOCUMENTS 3,431,351 12/1963 Sennhenn ...................... 358/160
3,704,419 11/1972 Rheinfelder ..................... 358/86
4,148,069 4/1979 Smiley ............................ 358/160
4,151,490 4/1979 Bazin .............................. 358/35
4,477,913 10/1984 Koya .............................. 333/18
4,984,079 1/1991 Ho .................................. 358/160

FOREIGN PATENT DOCUMENTS 3148242 6/1983 Fed. Rep. of Germany .

*Primary Examiner*—James J. Groody
*Assistant Examiner*—Sherrie Hsia
*Attorney, Agent, or Firm*—Edward W. Goodman

[57] ABSTRACT

In an automatic cable attenuation compensation system comprising a fixed compensation part (FC-R/G/B) providing a stepwise adjustable attenuation compensation for substantially compensating cable attenuation, the stepwise adjustable attenuation compensation of the fixed compensation part being set after power-up, an adaptive compensation part (VC-R/G/B) is provided for a continuously active compensation for a further accurate compensation of the cable attenuation.

4 Claims, 2 Drawing Sheets

AUTOMATIC CABLE ATTENUATION COMPENSATION SYSTEM

BACKGROUND OF THE INVENTION

1. Field of the Invention

The invention relates to an automatic cable attenuation compensation system.

As a consequence of the skin effect, coax cable attenuation expressed in dB increases with the frequency of the transmitted signal in proportion to the root of this frequency. The attenuation is further dependent on, inter alia, the length and the diameter of the cable. Such an attenuation is especially disturbing when baseband video signals are transmitted, while in the case of transmission of double-sided amplitude modulated signals, the relatively less attenuated left side-band and the relatively more attenuated right side-band can be combined to obtain a substantially flat amplitude characteristic. Such an easy compensation is not available when baseband video signals are transmitted.

2. Description of the Related Art

In applications where video signals have to be transmitted over relatively long coax cables of variable length, (semi-)automatic cable attenuation compensation systems are used. DE-A-31.48242 discloses a system which determines the cable length at power-up to switch on a fixed compensation suitable for compensating the frequency-dependent attenuation within certain limits for one type of coax cable in steps of several meters. This step-wise compensation entails the drawback that any cable attenuation which is within the resolution of the attenuation compensation system is not compensated for, so that no optimal flat frequency characteristic for intermediate cable lengths is obtained. Further, such step-wise cable attenuation compensating systems may only be operative directly after power-up, because a step-wise adjustment of the compensation at a later stage would result in a disturbed picture. This entails the drawback that any temperature-dependent attenuation caused by temperature changes cannot be compensated for.

On the other hand, U.S. Pat. No. 3,431,351 discloses an automatic frequency characteristic correction system which provides a continuous compensation of the frequency-dependent attenuation. The compensation range of such a continuously operative compensator is, however, rather small, so that no adequate compensation is obtained when the attenuation effected by the cable falls outside this range.

SUMMARY OF THE INVENTION

It is, inter alia, an object of the invention to provide an improved automatic cable attenuation compensation system. For this purpose, a first aspect of the invention provides an automatic cable attenuation compensation system comprising a fixed compensation part (FC-R/G/B) providing a stepwise adjustable attenuation compensation for substantially compensating cable attenuation, the stepwise adjustable attenuation compensation of the fixed compensation part being set after power-up, and an adaptive compensation part (VC-R/G/B) providing a continuously active compensation for a further compensation of the cable attenuation.

As a consequence of the addition of the adaptive compensation part providing a continuously active compensation for a further accurate compensation of the cable attenuation, to the prior an stepwise adjustable fixed compensation pan, both the remaining cable attenuation falling between the steps of the stepwise fixed compensation, and any temporal (temperature-dependent) variations in the attenuation, are corrected, while the overall system has a large correction range.

If the cable is a multi-core cable having a plurality of channels for, for example, R, G, and B signals, the adaptive compensation part advantageously includes a separate, independent adaptive compensator for each channel to avoid that mutual differences between the channels are not compensated for when the attenuation of only one channel is measured to obtain a control signal for all channels. In the compensation system of U.S. Pat. No. 3,431,351, the compensation to be applied to one wire of the cable is based on a DC attenuation measured in another wire of the cable, with the disadvantage that the mutual differences between the wires are not taken into account.

A high quality flat frequency response is obtained if the adaptive compensation pan includes a first automatic gain control for compensating for an attenuation of a low-frequency test signal included in the signal transmitted over the cable, and a high-frequency automatic gain control for compensating for an attenuation of a high-frequency test signal included in the signal transmitted through the cable.

These and other aspects of the invention will be apparent from and elucidated with reference to the embodiments described hereinafter.

DESCRIPTION OF THE PREFERRED EMBODIMENT

In one embodiment of the invention, a first test signal having a continuous amplitude equal to the maximum value of the video signal is added to the video signal during at least one active line period in the vertical blanking interval, while a second test signal forming a sine wave of the same amplitude and a frequency of about $\frac{3}{5}$ of the maximum pass-bandwidth is added to the video signal during at least one other active line period in the vertical blanking interval. For example, when the pass-bandwidth is 30 MHz, a frequency of 18 MHz is chosen, while a frequency between 3 and 5 MHz can be chosen with a pass-bandwidth of 5.5 MHz.

Figure 1:
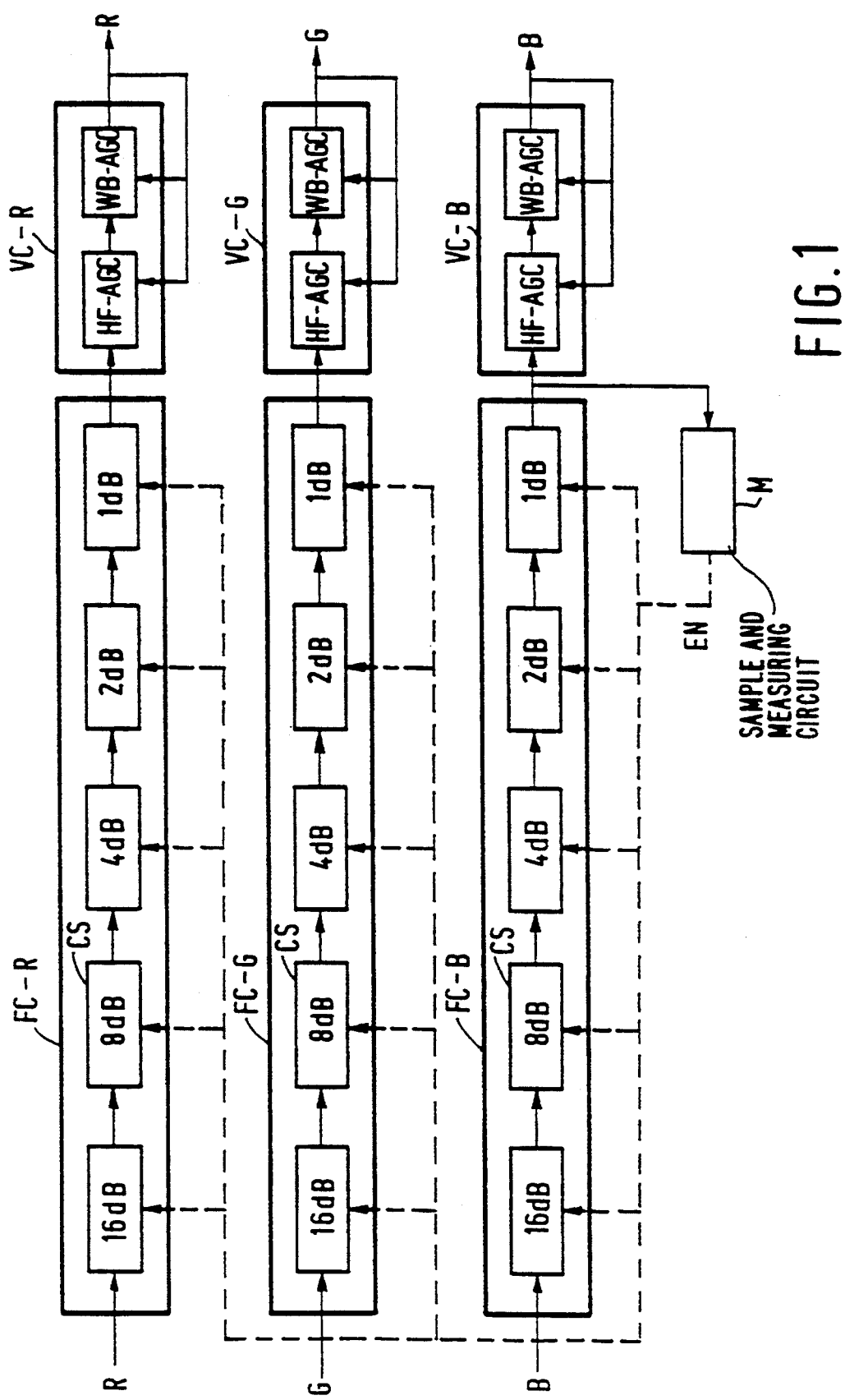
FIG. 1 shows an embodiment of an automatic cable attenuation compensation system in accordance with the present invention.

The automatic cable attenuation compensation system shown in FIG. 1 comprises, in each channel R, G, B, a fixed compensation part FC-R, FC-G, FC-B, respectively, as well as variable compensation parts VC-R, VC-G, VC-B, respectively. The fixed compensation parts include a plurality of switchable compensation sections CS each capable of compensating for a predetermined amount of cable attenuation. At the highest frequency of the video band, one compensation section CS may compensate for 1 dB, 2 dB, 4 dB, 8 dB or 16 dB. The compensation section (CS 16 dB) providing the largest compensation may appear more than once.

In at least one channel, the blue channel B in the embodiment of FIG. 1, the cable attenuation compensation system comprises a sample and measuring circuit M furnishing enabling control signals EN through a control signal bus to enable the switchable compensation circuits CS. The line numbers of the first and second test signal lines are known to the system, so that the corresponding sampling signals for the test signals can be generated. The required switchable cable attenuation compensation is automatically determined at power-up. The compensation starts at 0 dB and is increased by steps of 1 dB (at the maximum frequency) until a reference level in the sample and measuring circuit M is obtained. The enabling control signals EN furnished by the sample and measuring circuit M ensure that this state is maintained. The start-up procedure is repeated after each interruption of the signal. More specifically, the amplitude of the sine wave second test signal is measured, and compensation sections CS are switched on and off in steps of 1 dB until the sine wave amplitude of the transmitted second test signal just exceeds the maximum video signal amplitude. Then, the measurement is finished and the measuring circuit M freezes its output control signals EN. If the video signal disappears, the measuring circuit M resets itself, so that the measurement is repeated when the video signal reappears.

The variable compensation sections VC-R, VC-G, VC-B of the cable attenuation compensation system comprise in each channel R, G, B, a continuous (wideband) automatic gain control amplifier WB-AGC for the complete signal and a continuous automatic gain control amplifier HF-AGC for the high-frequency part of the signal, whose amplification increases with the root of the frequency. Both AGC circuits HF-AGC, WB-AGC include sample circuits for the continuous amplitude first test signal and the sine wave second test signal, respectively, as well as the required continuous control circuits.

The maximum 1 dB deviation in the frequency-characteristic caused by the compensation magnitude of the smallest compensation section (CS 1 dB) of the fixed compensation parts FC-R, FC-G, FC-B, plus the mutual differences in cable attenuation of the different coax cables used in the multi-core cable, and the cable attenuation variations appearing during operation of the system caused, for example, by temperature variations of the cables or of the circuits employed, are measured in each channel R, G, B during each field period and compensated for by means of the two continuous AGC amplifiers in the variable compensation parts VC-R, VC-G, VC-B, so that the frequency characteristics of the signals remain optimally flat.

A novel feature provided by the present invention is the addition of continuously operational cable attenuation compensation systems in the variable compensation parts VC-R, VC-G, VC-B. The new system comprises the following major features:

1. The video signal compensation is fully automatic.
2. The video signals are individually and optimally compensated with a maximally flat frequency characteristic, notwithstanding mutual spread in properties of the coax cables used.
3. This optimal compensation operates continuously to remove attenuation variations in cables and circuits which are caused, for example, by temperature variations.
4. The system is capable of working with other cables without adjustments as long as the maximum cable attenuation is within the total range of the compensation circuits.
5. The system can be used in two directions, so that return video signals from the camera processing unit to the camera, such as viewfinder and teleprompter signals, are corrected too.

Figure 2:
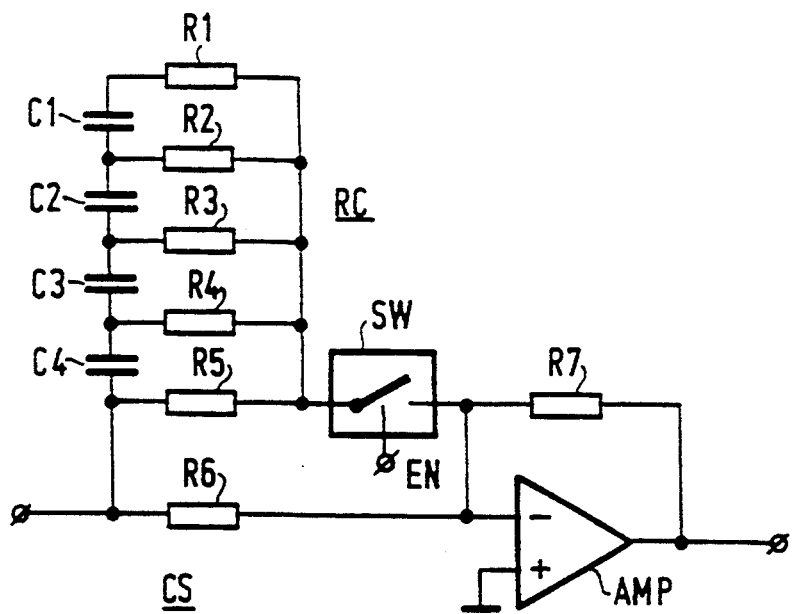
FIG. 2 shows an embodiment of a compensation section for use in the embodiment of FIG. 1.

FIG. 2 shows an example of a compensation section CS suitable for use in the fixed compensation part of FIG. 1. The input of the section is coupled to an inverting input of an amplifier AMP through the parallel circuit of a resistor R6 and the series circuit of a filter RC and a switch SW controlled by the enabling control signal EN of the compensation section CS. The amplifier AMP is fed back by means of a resistor R7. The non-inverting input of the amplifier AMP is connected to ground, and its output is connected to the output of the compensation section CS. In dependence on the enabling control signal EN, such a section operates as an inverting buffer or as a cable compensation section. The RC filters R1, C1, R2, C2, R3, C3, R4, C4, R5 are designed in such a way that one section CS yields a maximal compensation of 16, 8, 4, 2 or 1 dB at 30 MHz, while the transfer function is proportional to the root of the frequency.

Figure 3:
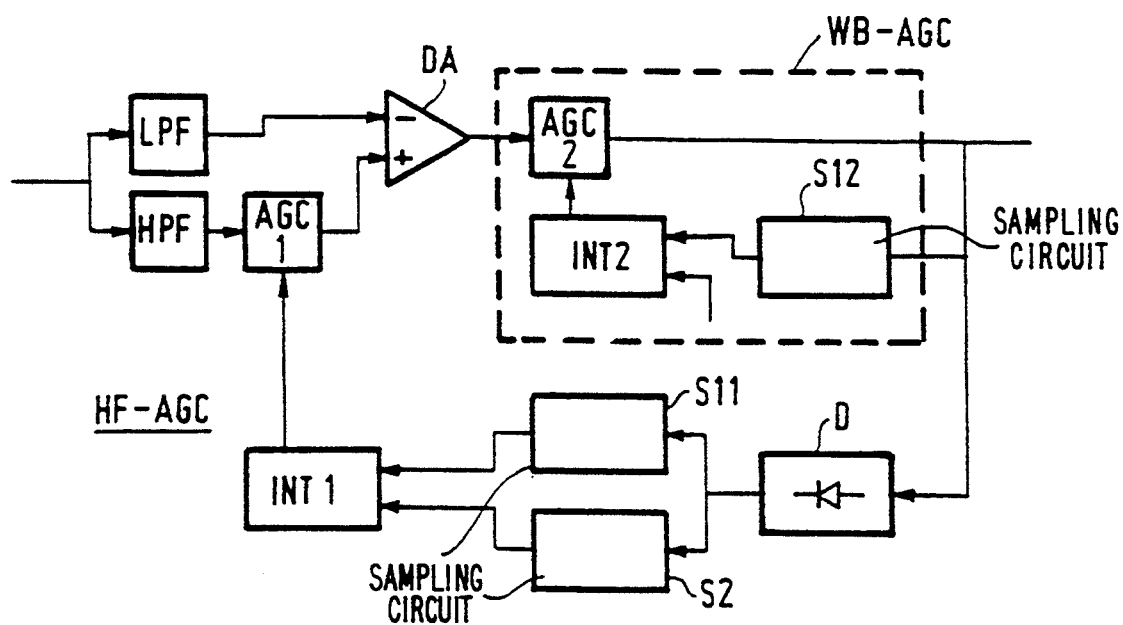
FIG. 3 shows a block circuit diagram of an automatic gain control circuit for use in the embodiment of FIG. 1.

FIG. 3 shows a block circuit diagram of a combination of AGC circuits HF-AGC, WB-AGC suitable for use in the variable compensation pans VC-R, VC-G, VC-B. The input of the circuit HF-AGC is coupled to the inverting input of a differential amplifier (subtracter) DA through a low-pass filter LPF and to the non-inverting input of the amplifier DA through a high-pass filter HPF and an AGC circuit AGC1. The output of the amplifier DA forms the output of the circuit HF-AGC which is connected to the input of the circuit WB-AGC. The control signal for the circuit AGC1 is derived from the output signal of the automatic cable attenuation circuit at the output of the circuit WB-AGC in the following manner. The output signal is full-wave rectified by a rectifying circuit D, and subsequently sampled by a sampling circuit S11 which samples the continuous maximum amplitude first test signal and by a sampling circuit S2 which samples the sine wave second test signal. The difference between the sampled amplitudes of the first and second test signals is determined and integrated by a circuit Int1 which furnishes the control signal for the AGC circuit AGC1.

The circuit WB-AGC comprises an AGC circuit AGC2 whose input is coupled to the output of the circuit HF-AGC and whose output furnishes the output signal of the automatic cable attenuation circuit. The control signal for the circuit AGC2 is derived from this output signal by a sampling circuit S12 which samples the continuous maximum amplitude first test signal, and by a circuit Int2 which determines and integrates the difference between the sampled amplitude of the first test signal and a reference signal having the maximum amplitude of the video signal.

In a preferred embodiment of the automatic cable attenuation in accordance with the present invention, one of the goals was to automatically compensate for any cable length. This is realized by dividing the total compensation into a fixed part and an adaptive part.

The fixed part can compensate any cable length with a resolution of 12.5 m. This length is determined at power-up, by means of a successive approximation measurement, viz. the total compensation in the fixed part is increased until the (18 MHz) HF-burst signal amplitude in the vertical gap of one video channel is its original, known, value.

The adaptive part, which is independent in each channel and continuously active, has two functions:
1. It has to compensate the last few meters of the multi-core cable which are within the resolution of the fixed part.
2. It has to compensate (frequency dependent) loss differences which might be caused by, for instance, temperature changes of the multi-core cable and-/or differences between the individual coaxes.

The invention thus provides a system for automatic continuous individual cable attenuation with optimum flat frequency response for baseband video signals transmitted via coax or multi-core cable.

It should be noted that the above-mentioned embodiments illustrate rather than limit the invention, and that those skilled in the art will be able to design many alternative embodiments without departing from the scope of the appended claims.

We claim:

1. An automatic cable attenuation compensation system for use in compensating for cable attenuation losses in a signal transmitted in a cable, comprising:
    means for generating and adding at least one test signal to the signal being transmitted in the cable at one end of the cable;
    a fixed compensation part (FC-R/G/B) coupled to another end of the cable, said fixed compensation part having a plurality of fixed compensation sections thereby providing a stepwise adjustable attenuation compensation for substantially compensating cable attenuation over an entire predetermined range of compensation, said fixed compensation part further including a measuring and setting circuit for measuring the test signal and for activating selective ones of the plurality of fixed compensation sections until a level of said at least one test signal reaches a predetermined reference level, the stepwise adjustable attenuation compensation of the fixed compensation part being set after power-up; and
    an adaptive compensation part (VC-R/G/B) coupled to an output of said fixed compensation part, said adaptive compensation part including a means for measuring said test signal and for generating a control signal based on the level of said at least one test signal, and automatic gain control means coupled to said measuring means for providing a continuously active compensation, equivalent to one of said stepwise adjustable attenuation compensation of said fixed compensation part, for a further compensation of the cable attenuation based on said control signal.

2. An automatic cable attenuation compensation system as claimed in claim 1, wherein said cable is a multi-core cable having a plurality of channels (R, G, B) and said adaptive compensation part (VC-R/G/B) includes a separate, independent adaptive compensator (VC-R, VC-G, VC-B) for each channel (R, G, B).

3. An automatic cable compensation system as claimed in claim 1, wherein said generating and adding means generates a low-frequency test signal and a high-frequency test signal, and wherein said automatic gain control means in said adaptive compensation part (VC-R/G/B) includes first automatic gain control means (WB-AGC) for compensating for an attenuation of said low-frequency test signal included in said signal transmitted through said cable, and second automatic gain control means (HF-AGC) for compensating for an attenuation of said high-frequency test signal included in said signal transmitted through said cable.

4. An automatic cable attenuation compensation system as claimed in claim 3, wherein said low-frequency test signal has a continuous high amplitude and said high-frequency test signal is a high-frequency sine wave signal with a high amplitude.

* * * * *